United States Patent
Shi et al.

(10) Patent No.: US 9,533,704 B2
(45) Date of Patent: Jan. 3, 2017

(54) ELECTRIC-CONTROL MULTIMODE STEERING VALVE, STEERING HYDRAULIC CONTROL SYSTEM, AND WHEEL TYPE CRANE

(71) Applicant: Xuzhou Heavy Machinery Co., Ltd., Xuzhou (CN)

(72) Inventors: Xianxin Shi, Xuzhou (CN); Honggang Ding, Xuzhou (CN); Haixiang Ye, Xuzhou (CN); Xin Fang, Xuzhou (CN); Fuyi Zhang, Xuzhou (CN)

(73) Assignee: Xuzhou Heavy Machinery Co., Ltd., Xuzhou (CN)

( * ) Notice: Subject to any disclaimer, the term of this patent is extended or adjusted under 35 U.S.C. 154(b) by 0 days.

(21) Appl. No.: 14/706,598

(22) Filed: May 7, 2015

(65) Prior Publication Data

US 2015/0307124 A1   Oct. 29, 2015

Related U.S. Application Data

(63) Continuation of application No. PCT/CN2013/087187, filed on Nov. 15, 2013.

(30) Foreign Application Priority Data

Nov. 27, 2012   (CN) .......................... 2012 1 04925252

(51) Int. Cl.
*B62D 5/06* (2006.01)
*B62D 5/08* (2006.01)
(Continued)

(52) U.S. Cl.
CPC ................. *B62D 5/08* (2013.01); *B62D 5/065* (2013.01); *B62D 5/091* (2013.01); *B62D 5/20* (2013.01); *B62D 7/1509* (2013.01); *F15B 13/085* (2013.01)

(58) Field of Classification Search
CPC ........... B62D 5/08; B62D 5/065; B62D 5/091; B62D 5/20; B62D 7/1509; F15B 13/085
See application file for complete search history.

(56) References Cited

U.S. PATENT DOCUMENTS

| 5,012,881 A | 5/1991 | Yokote et al. |
| 5,230,399 A | 7/1993 | Plate |

(Continued)

FOREIGN PATENT DOCUMENTS

| CN | 1702007 A | 11/2005 |
| CN | 101489853 A | 7/2009 |

(Continued)

OTHER PUBLICATIONS

International Search Report mailed Feb. 20, 2015 in PCT/CN2013087187, 4 pages.

(Continued)

*Primary Examiner* — Joseph Rocca
*Assistant Examiner* — Marlon A Arce
(74) *Attorney, Agent, or Firm* — Kilpatrick Townsend & Stockton LLP

(57) ABSTRACT

An electric-control multimode steering valve comprises: a flow distributing and collecting valve, a first electromagnetic valve, and a second electromagnetic valve. A valve body comprises four groups of paired valve oil ports. First oil ports of the first and second electromagnetic valves are in communication with a first group. Second oil ports of the first and second electromagnetic valves are in communication with a second group. A third oil port of the first electromagnetic valve is in communication with a flow collecting port of the flow distributing and collecting valve. A first flow distributing port of the flow distributing and collecting valve and a third oil port of the second electromagnetic valve are in communication with a third group. A (Continued)

second flow distributing port of the flow distributing and collecting valve and the third oil port of the second electromagnetic valve are in communication with a fourth group.

19 Claims, 6 Drawing Sheets

(51) Int. Cl.
*B62D 7/15* (2006.01)
*B62D 5/065* (2006.01)
*B62D 5/09* (2006.01)
*B62D 5/20* (2006.01)
*F15B 13/08* (2006.01)

(56) References Cited

U.S. PATENT DOCUMENTS

2012/0109459 A1\* 5/2012 Bichler et al. ........... B62D 5/09
 701/41
2015/0259886 A1\* 9/2015 Imanishi et al. ......... B62D 1/22
 180/418
2015/0298730 A1\* 10/2015 Wiktor et al. ......... B62D 12/00
 180/420

FOREIGN PATENT DOCUMENTS

| CN | 102923188 A | 2/2013 |
| CN | 202923708 U | 5/2013 |
| JP | H03287470 A | 12/1991 |
| JP | H0699824 A | 4/1994 |
| JP | H09240503 A | 9/1997 |
| JP | 2002154445 A | 5/2002 |
| RU | 2344959 C1 | 1/2009 |
| RU | 2378539 C1 | 1/2010 |
| RU | 2493995 C2 | 9/2013 |
| WO | 2004069633 A1 | 8/2004 |

OTHER PUBLICATIONS

Patent Examination Report No. 1 dated Mar. 24, 2016 in AU Patent Application No. 2013351662. 2 pages.
Extended European Search Report dated Jul. 15, 2016 in EP Patent Application No. 13858490.9. 8 pages.

\* cited by examiner

US 9,533,704 B2

ELECTRIC-CONTROL MULTIMODE STEERING VALVE, STEERING HYDRAULIC CONTROL SYSTEM, AND WHEEL TYPE CRANE

CROSS-REFERENCE TO RELATED APPLICATIONS

This application is a continuation application of PCT application PCT/CN2013/087187 entitled "ELECTRIC-CONTROL MULTIMODE STEERING VALVE, STEERING HYDRAULIC CONTROL SYSTEM, AND WHEEL TYPE CRANE," filed on Nov. 15, 2013, which claims priority to Chinese Patent Application No. 201210492525.2, filed on Nov. 27, 2012, which are herein incorporated by reference in their entirety for all purposes.

TECHNICAL ART

The invention relates to the art of engineering machinery, particularly to an electric-control multimode steering valve, a steering hydraulic control system and a wheel type crane.

BACKGROUND OF THE INVENTION

Currently, engineering vehicles are normally provided with multimode steering function to cope with complicated site conditions. Here, "multimode steering" means multiple kinds of steering modes of vehicles, which usually comprises front axle independent steering, rear axle independent steering, sharp turn (also referred as "coordination") steering, and crab type steering. During sharp turn steering, the steering directions of front axle wheels and rear axle wheels are opposite so as to achieve minimum steering radius, which is called "sharp turn steering". During crab type steering, the steering directions of front axle wheels and rear axle wheels are same to achieve movement like a crab, which is called "crab type steering". FIG. 1 is a schematic view showing common four steering modes.

Such multimode steering is normally carried out by manual control manipulation and electrically control manipulation. In the manual control manipulation, a manual-controlled multimode steering valve is employed, and the steering principle of its use is shown in FIG. 2. When the driver manipulates the steering wheel a4, the hydraulic oil provided by a steering pump is outputted by a full hydraulic steering device a3 from A port or B port according to the leftward or rightward turn of the steering wheel, then the hydraulic oil enters a front axle steering oil cylinder a1 and a rear axle steering oil cylinder a5 via a tandem multimode steering valve a2, so as to make wheels turn leftward or rightward.

When the valve core of the multimode steering valve a2 is located in the first position from left, the hydraulic oil outputted from the steering device only passes through the front axle steering oil cylinder, to perform front axle independent steering function. When the valve core of the multimode steering valve a2 is located in the second position from left, the hydraulic oil outputted from the steering device passes through the front axle steering oil cylinder and the rear axle steering oil cylinder in order, to make wheels turn, at this time the steering directions of front axle wheels and rear axle wheels are opposite so as to perform sharp turn steering function. When the valve core of the multimode steering valve a2 is located in the third position from left, the hydraulic oil outputted from the steering device only passes through the rear axle steering oil cylinder, to perform rear axle independent steering function. When the valve core of the multimode steering valve a2 is located in the fourth position from left, the hydraulic oil outputted from the steering device passes through the front axle steering oil cylinder and the rear axle steering oil cylinder in order, to make wheels turn, at this time the steering directions of front axle wheels and rear axle wheels are same so as to perform crab type steering function.

At present, the electrically control manipulation comprises electro-hydraulic proportional control and electromagnetic valve control. FIG. 3 shows the principle of an electro-hydraulic proportional controlled multimode steering system. The front axle wheels are controlled by the driver via the manipulation of the steering wheel, while as to the turning angle of each rear axle wheel, various electric signals are outputted by programs set in a controller according to the turning angle of a certain front axle wheel and the steering mode selected by the driver, so as to control the opening degree of electro-hydraulic proportional controlled valve and hydraulic oil flow, make steering oil cylinders push wheels steer according to the driver's intention, thus the multimode steering function is achieved. The turning angles of wheels are detected by encoders mounted on the axles.

FIG. 4 shows the principle of electromagnetic valve controlled parallel multimode steering, in which multimode selection are made by means of switching valve position of an electromagnetic valve, and the front and rear axle steering oil cylinders perform parallel actions by means of a flow distributing and collecting valve.

There are certain defects in all the three above conventional multimode steering solutions. When the manual-controlled multimode steering valve shown in FIG. 2 is switched into the sharp turn steering position or crab type steering position (i.e. when the valve core is located at the second or fourth position from the left), the front and rear axle steering oil cylinder are in tandem. After the pressure provided by the hydraulic system makes the front axle steer, the remaining pressure is required to make the rear axle steer. Thus the pressure of the front axle steering oil cylinder is so large that the sealing requirement is high, while the switching valve in manual control manipulation is complicated in structure and the valve core is special in performance, resulting in high cost.

In the electro-hydraulic proportional control multimode steering solution shown in FIG. 3, the accuracy, sensitivity and reliability of the wheel turning angle excessively depend on the precision and reliability of electric and hydraulic elements. Once the electric elements (specifically encoder, controller) fail, the steering system will not work as the driver requires, which is dangerous to high speed running vehicles. Moreover, such control system is relatively complicated in structure, needs professional staff to operate, is inconvenience in maintenance, and is relatively expensive.

The double flow distributing parallel multimode steering valves shown in FIG. 4 causes large system pressure loss due to employing two flow distributing and collecting valves. Meanwhile, during the front axle independent steering or rear axle independent steering, oil outputted by the steering device only partially enters the front (rear) axle steering oil cylinder, half or more of oil is wasted. When a sharp turn steering is carried out in these two modes, since the oil outputted by the steering device is not enough to make the flow distributing and collecting valves achieve normal flow distribution, sharp turn steering action tends to fail. However, during high speed running, sharp turn is often required to correct the direction, thus the above failure will threaten the road safety seriously.

BRIEF SUMMARY OF THE INVENTION

The invention aims at providing an electric-control multimode steering valve, a steering hydraulic control system and a wheel type crane, which are capable of achieve multimode steering of engineering vehicles, reliable and cost effective.

For the above purpose, the invention provides an electric-control multimode steering valve comprising a flow distributing and collecting valve, a first electromagnetic exchange valve and a second electromagnetic exchange valve. A valve body of the electric-control multimode steering valve comprises four groups of paired valve oil ports. The flow distributing and collecting valve has a flow collecting port, a first flow distributing port and a second flow distributing port. The first electromagnetic exchange valve and the second electromagnetic exchange valve each has a first oil port, a second oil port and a third oil port. The first oil ports of the first electromagnetic exchange valve and the second electromagnetic exchange valve are respectively communicated with the first group of valve oil ports of the valve body, the second oil ports of the first electromagnetic exchange valve and the second electromagnetic exchange valve are respectively communicated with the second group of valve oil ports of the valve body, the third oil port of the first electromagnetic exchange valve is communicated with the flow collecting port of the flow distributing and collecting valve, the first flow distributing port of the flow distributing and collecting valve and the third oil port of the second electromagnetic exchange valve are respectively communicated with the third group of valve oil ports of the valve body, the second flow distributing port of the flow distributing and collecting valve and the third oil port of the second electromagnetic exchange valve are respectively communicated with the fourth group of valve oil ports of the valve body.

Moreover, the electric-control multimode steering valve switches the first electromagnetic exchange valve and the second electromagnetic exchange valve to achieve: a first operating mode, during which the first group of valve oil ports of the valve body is communicated with the second group of valve oil ports; and a second operating mode, during which the first group of valve oil ports of the valve body is communicated with the third group of valve oil ports and the fourth group of valve oil ports.

Moreover, the electric-control multimode steering valve further comprises a third electromagnetic exchange valve which has two groups of paired oil ports, the second flow distributing port of the flow distributing and collecting valve and the third oil port of the second electromagnetic exchange valve are respectively communicated with the first group of oil ports of the third electromagnetic exchange valve, in turn communicated with the fourth group of valve oil ports of the valve body via the second group of oil ports of the third electromagnetic exchange valve.

Moreover, the electric-control multimode steering valve switches the first electromagnetic exchange valve, the second electromagnetic exchange valve and the third electromagnetic exchange valve to achieve a third operating mode, during which the first group of valve oil ports of the valve body is communicated with the third group of valve oil ports and the fourth group of valve oil ports, the oil flow directions in the first group of valve oil ports and the fourth group of valve oil ports are different from those in the second operating mode.

Moreover, the electric-control multimode steering valve further comprises a fourth electromagnetic exchange valve which has two groups of paired oil ports, the first group of valve oil ports of the valve body is communicated with the first group of oil ports of the fourth electromagnetic exchange valve, in turn communicated with the first oil ports of the first electromagnetic exchange valve and the second electromagnetic exchange valve via the second group of oil ports of the fourth electromagnetic exchange valve.

Moreover, the electric-control multimode steering valve switches the first electromagnetic exchange valve, the second electromagnetic exchange valve and the fourth electromagnetic exchange valve to achieve a fourth operating mode, during which the first group of valve oil ports of the valve body is communicated with the second group of valve oil ports, the oil flow directions in the first group of valve oil ports and the second group of valve oil ports are different from those in the first operating mode.

Moreover, the first electromagnetic exchange valve and the second electromagnetic exchange valve are both two-position three-way electromagnetic exchange valve.

Moreover, the third electromagnetic exchange valve and the fourth electromagnetic exchange valve are both two-position four-way electromagnetic exchange valve.

For the above purpose, the invention provides a steering hydraulic control system comprising a full hydraulic steering device, a safety valve set, a first group of independent steering oil cylinder and a second group of independent steering oil cylinder. The full hydraulic steering device has two groups of oil ports, the first group of which establishes a system circuit with a pressure circuit and an oil circuit respectively, wherein the steering hydraulic control system further comprises the above electric-control multimode steering valve, the first group of valve oil ports of the valve body of the electric-control multimode steering valve is communicated with the second group of oil ports of the full hydraulic steering device, the second group of valve oil ports of the valve body is communicated with the first group of independent steering oil cylinder, the third and fourth groups of valve oil ports of the valve body are communicated with the first group of independent steering oil cylinder and the second group of independent steering oil cylinder via the safety valve set.

For the above purpose, the invention provides a wheel type crane, comprising a vehicle body having two groups of wheels and a driver's cab having a steering wheel and an electric-control multimode selection switch therein. The wheel type crane further comprises the above steering hydraulic control system, the steering wheel is connected to the full hydraulic steering device in the steering hydraulic control system, the two groups of wheels are connected to a first group of independent steering oil cylinder and a second group of independent steering oil cylinder in the steering hydraulic control system respectively, the electric-control multimode selection switch is connected to electromagnetic exchange valves in the electric-control multimode steering valve of the steering hydraulic control system, the electric-control multimode selection switch sends out corresponding switching signals to the electromagnetic exchange valves in the electric-control multimode steering valve by selecting various operating modes.

Based on the above solutions, the present electric-control multimode steering valve achieves the switching of independent steering and non-independent steering modes by means of the first electromagnetic exchange valve and the second electromagnetic exchange valve. In the non-independent steering mode, the pressure oil input is adjusted to parallel inputs into two groups of independent steering oil cylinders by the flow distributing and collecting valve, so that the steering pressure of the two groups of independent steering oil cylinders do not influence each other, to avoid pressure buildup in the conventional pressure tandem structure of two groups of oil cylinders, reduce the pressure of steering system effectively, and improve the working reliability of system. In the independent steering mode, pressure oil need not pass by the flow distributing and collecting valve and all flows into a certain independent steering oil cylinder, to avoid the oil waste in the conventional double flow distributing and collecting valve and the phenomenon of incapable of correcting sharp turn steering, thus improves the system energy utilization ratio and road safety. The present electric-control multimode steering valve is simple in structure, the electromagnetic exchange valves and flow distributing and collecting valve needed belong to common valves, which are easily available and cost effective.

In another embodiment, a third electromagnetic exchange valve is added in the electric-control multimode steering valve. The pressure oil directions respectively inputted into the two groups of independent steering oil cylinders are changed by the third electromagnetic exchange valve, so as to achieve sharp turn steering and crab type steering modes in the non-independent steering mode.

In another embodiment, a fourth electromagnetic exchange valve is added in the electric-control multimode steering valve. When an engineering vehicle is reversing, the front wheel steering mode is switched into the rear wheel steering mode automatically. In the independent steering mode, the pressure oil enter direction may be switched by means of the fourth electromagnetic exchange valve, so as to conform to the operating habit of the driver upon reversing.

BRIEF DESCRIPTION OF THE DRAWINGS

Figures, which constitute part of the application, are illustrated here to provide further understanding of the invention. The exemplary embodiments of the invention and their description are used to explain the invention, without improper limiting. In figures.

DETAILED DESCRIPTION OF THE INVENTION

Hereafter, the technical solution of the invention will be further described in detail by figures and embodiments.

Figure 1:
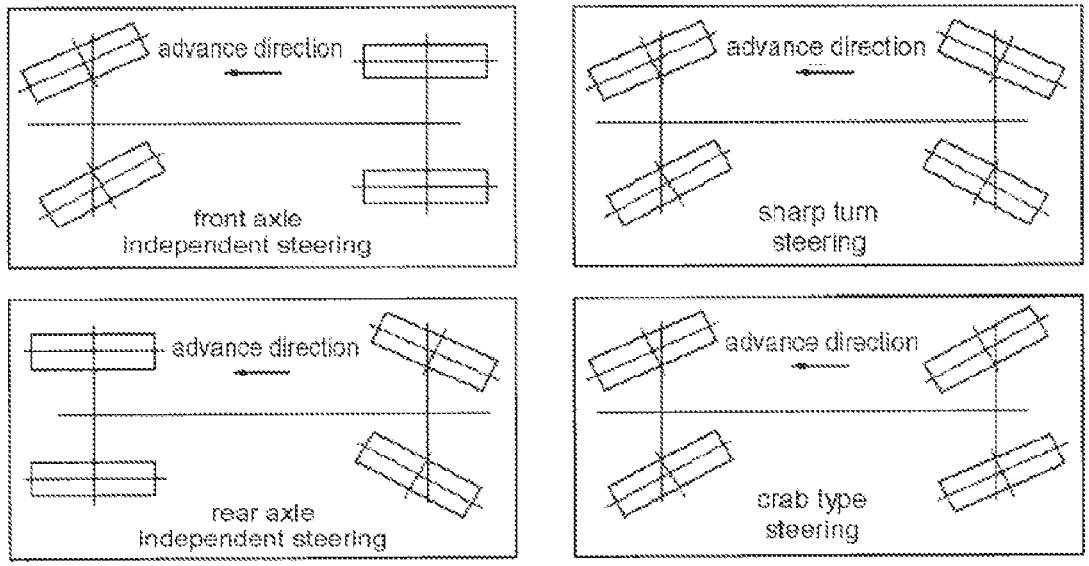
FIG. 1 is a schematic view showing four common steering mode.
Figure 2:
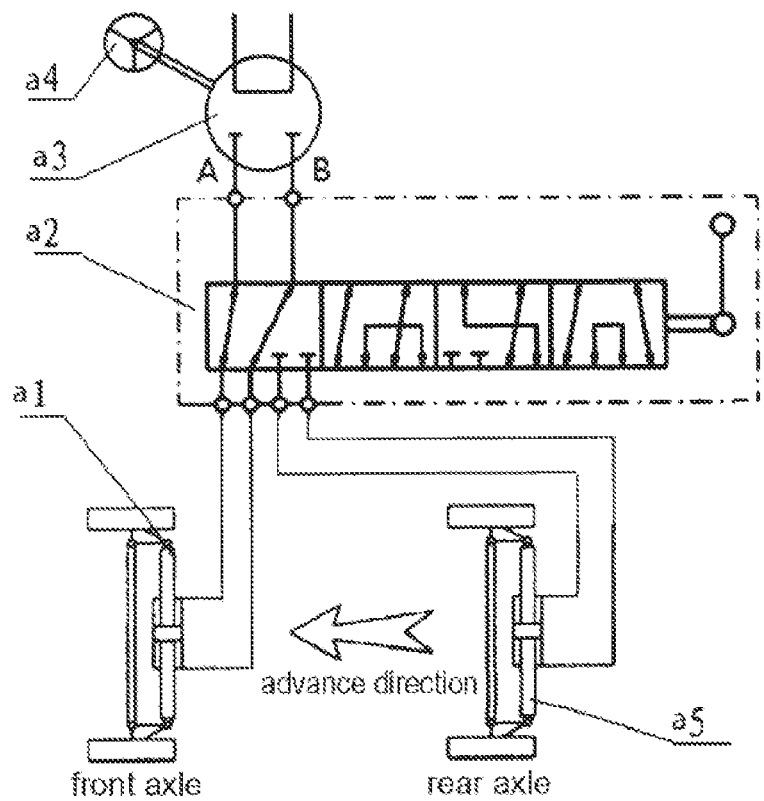
FIG. 2 is a schematic view showing the steering principle of conventional manual controlled multimode steering valve.
Figure 3:
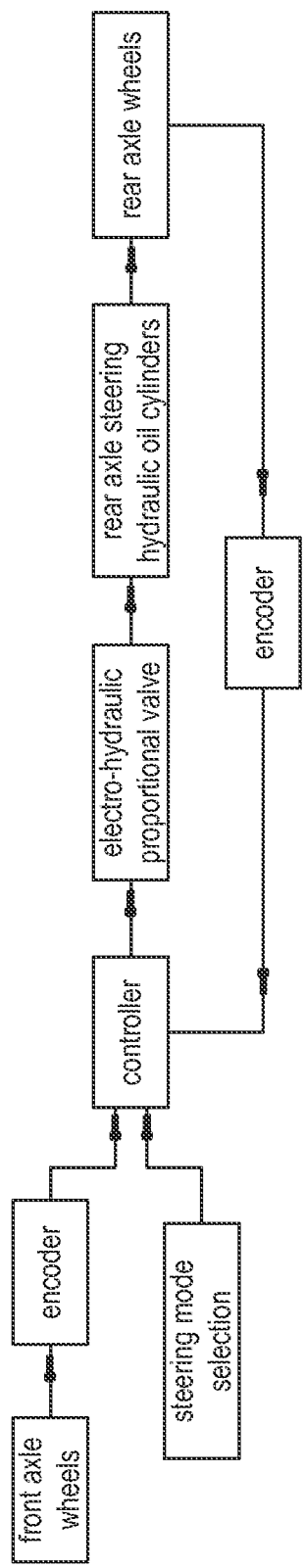
FIG. 3 is a schematic view showing the steering principle of conventional electro-hydraulic proportional controlled multimode steering system.
Figure 4:
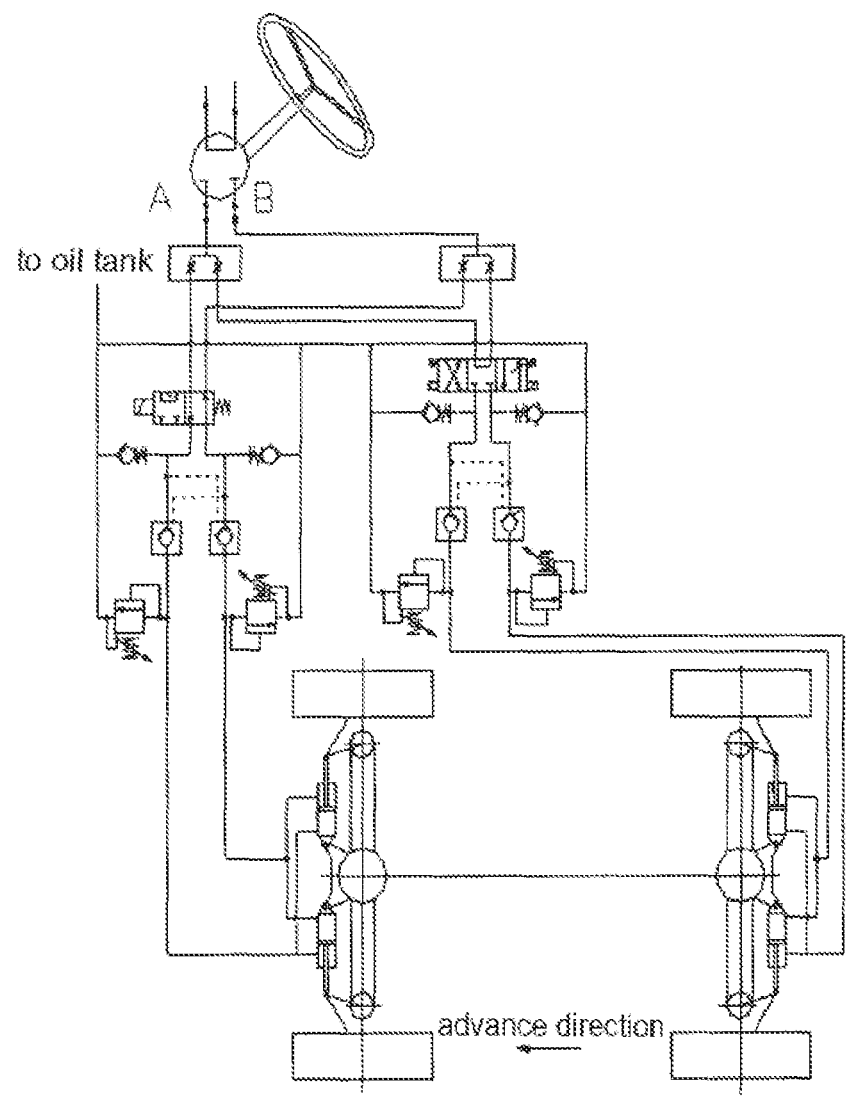
FIG. 4 is a schematic view showing the steering principle of conventional electromagnetic valve controlled parallel multimode steering solution.
Figure 5:
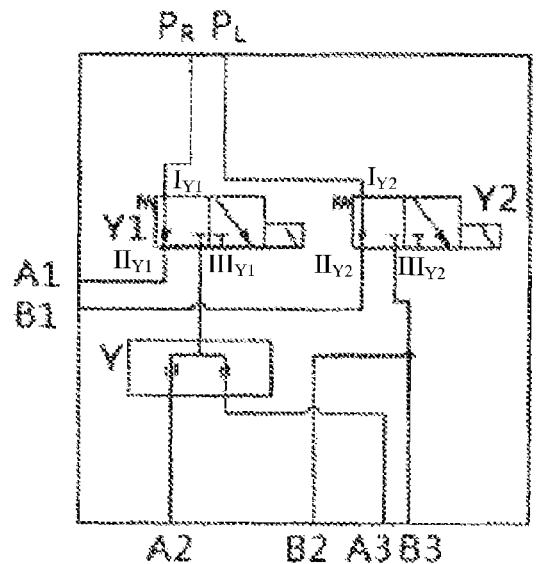
FIG. 5 is a structural schematic view showing the electric-control multimode steering valve according to the first embodiment of the invention.

FIG. 5 is a structural schematic view showing the electric-control multimode steering valve according to the first embodiment of the invention. In the embodiment, the electric-control multimode steering valve comprises a flow distributing and collecting valve Y, a first electromagnetic exchange valve Y1 and a second electromagnetic exchange valve Y2. A valve body of the electric-control multimode steering valve comprises four groups of paired valve oil ports. The flow distributing and collecting valve Y has a flow collecting port, a first flow distributing port and a second flow distributing port, the first electromagnetic exchange valve Y1 and the second electromagnetic exchange valve Y2 each has a first oil port, a second oil port and a third oil port.

The first oil ports [$I_{Y1}$, $I_{Y2}$] of the first electromagnetic exchange valve Y1 and the second electromagnetic exchange valve Y2 are respectively communicated with the first group of valve oil ports [$P_R$, $P_L$] of the valve body. The second oil ports [$II_{Y1}$, $II_{Y2}$] of the first electromagnetic exchange valve Y1 and the second electromagnetic exchange valve Y2 are respectively communicated with the second group of valve oil ports [A1, B1] of the valve body. The third oil port $III_{Y1}$ of the first electromagnetic exchange valve Y1 is communicated with the flow collecting port of the flow distributing and collecting valve Y. The first flow distributing port of the flow distributing and collecting valve Y and the third oil port $III_{Y2}$ of the second electromagnetic exchange valve Y2 are respectively communicated with the third group of valve oil ports [A2, B2] of the valve body. The second flow distributing port of the flow distributing and collecting valve Y and the third oil port $III_{Y2}$ of the second electromagnetic exchange valve Y2 are respectively communicated with the fourth group of valve oil ports [A3, B3] of the valve body.

In the embodiment, the first electromagnetic exchange valve and the second electromagnetic exchange valve are used to selectively switch the operating modes, distribute the oil proportion by means of the flow distributing and collecting function of the flow distributing and collecting valve, so as to achieve the steering function of multiple modes. In view of the number and function of oil ports used in the first electromagnetic exchange valve and the second electromagnetic exchange valve, a two-position three-way electromagnetic exchange valve may be employed.

When the electric-control multimode steering valve of the embodiment is installed in a steering hydraulic control system, at least two operating modes can be selectively switched, wherein the two operating modes may be carried out by switching the first electromagnetic exchange valve and the second electromagnetic exchange valve.

During the first operating mode, the first group of valve oil ports [$P_R$, $P_L$] of the valve body is communicated with the second group of valve oil ports [A1, B1]. From FIG. 5, at this time the first electromagnetic exchange valve Y1 and the second electromagnetic exchange valve Y2 are both deenergized. The valve oil ports $P_R$ is directly communicated with the valve oil port A1, and the valve oil ports $P_L$ is directly communicated with the valve oil port B1, then the pressure oil may directly flow into independent steering oil cylinders of the steering hydraulic control system via the electric-control multimode steering valve. Compared with the above prior art, since the pressure oil directly flows into the independent steering oil cylinder without passing through the flow distributing and collecting valve, the oil waste in the double flow distributing steering valve may be avoided, and since the oil pressure is high enough, the phenomenon of failure in correction of sharp turn steering is avoided, so that the system energy utilization ratio and running safety is improved.

During the second operating mode, the first group of valve oil ports $[P_R, P_L]$ of the valve body is communicated with the third group of valve oil ports [A2, B2] and the fourth group of valve oil ports [A3, B3]. From FIG. 5, at this time the first electromagnetic exchange valve Y1 and the second electromagnetic exchange valve Y2 are both energized. The valve oil port $P_R$ is communicated with the valve oil ports A2, A3 respectively via the flow distributing and collecting valve Y, and the valve oil port $P_L$ is communicated with the valve oil ports B2, B3 respectively via the flow distributing and collecting valve Y. That is to say, when the pressure oil flows into the valve oil port $P_R$ and flows out of valve oil port $P_L$, the oil will be distributed in two by the flow distributing and collecting valve and reach the valve oil ports A2, A3. When the pressure oil flows into the valve oil port $P_L$ and flows out of valve oil port $P_R$, the oil flowing into the valve oil ports A2, A3 will be merged into one by the flow distributing and collecting valve and reach the valve oil port $P_R$.

During the second operating mode, two oil paths may be introduced out of the electric-control multimode steering valve, and are connected to the two groups of independent steering oil cylinders of the steering hydraulic control system, so as to coordinate the two groups of independent steering oil cylinders to steer. The steering manner may be crab type steering or sharp turn steering, depending on the connection manner of the third group of valve oil ports [A2, B2] and the fourth group of valve oil ports [A3, B3] to the two groups of independent steering oil cylinders.

In order to further perform the selection switching of crab type steering and sharp turn steering, a new electromagnetic exchange valve may be added to switch, and be arranged outside of the electric-control multimode steering valve of this embodiment to achieve its function, or be integrated into the electric-control multimode steering valve of this embodiment.

Figure 7:
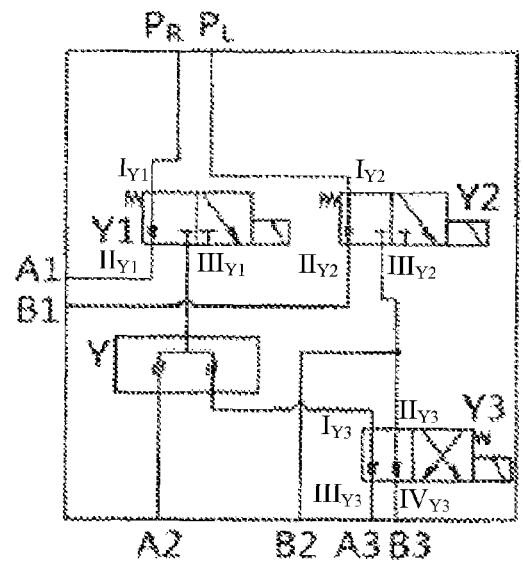
FIG. 7 is a structural schematic view showing the electric-control multimode steering valve according to the second embodiment of the invention.

FIG. 7 is a structural schematic view showing the electric-control multimode steering valve according to the second embodiment of the invention. Compared with the first embodiment, the electric-control multimode steering valve of this embodiment is integrated with a third electromagnetic exchange valve Y3, which has two groups of paired oil ports. The second flow distributing port of the flow distributing and collecting valve Y and the third oil port $III_{Y2}$ of the second electromagnetic exchange valve Y2 are respectively communicated with the first group of oil ports $[I_{Y3}, II_{Y3}]$ of the third electromagnetic exchange valve Y3, in turn communicated with the fourth group of valve oil ports [A3, B3] of the valve body via the second group of oil ports $[III_{Y3}, IV_{Y3}]$ of the third electromagnetic exchange valve Y3.

If the electric-control multimode steering valve of this embodiment is mounted in a steering hydraulic control system, selection switching of at least three operating modes may be achieved. In addition to the above two operating modes in the first embodiment, a third operating mode may be further achieved. The switching of the third operating mode and the second operating mode may be performed by the third electromagnetic exchange valve.

During the third operating mode, the first group of valve oil ports $[P_R, P_L]$ of the valve body is communicated with the third group of valve oil ports [A2, B2] and the fourth group of valve oil ports [A3, B3], and the oil flow directions in the first group of valve oil ports $[P_R, P_L]$ and the fourth group of valve oil ports [A3, B3] are different from those during the second operating mode. As shown in FIG. 7, during the second operating mode, at this time the first electromagnetic exchange valve Y1 and the second electromagnetic exchange valve Y2 are both energized, the third electromagnetic exchange valve Y3 is deenergized. The valve oil port $P_R$ is respectively communicated with the valve oil ports A2, A3 via the flow distributing and collecting valve Y, and the third oil port $III_{Y2}$ of the second electromagnetic exchange valve Y2 is respectively communicated with the valve oil port B2 and B3. When it is switched into the third operating mode, the first electromagnetic exchange valve Y1 and the second electromagnetic exchange valve Y2 are both energized, and the third electromagnetic exchange valve Y3 is energized. The valve oil port $P_R$ is respectively communicated with the valve oil ports A2 and B3 via the flow distributing and collecting valve Y, and the third oil port $III_{Y2}$ of the second electromagnetic exchange valve Y2 is respectively communicated with the valve oil port B2 and A3. Thus the oil flow direction is changed by the third electromagnetic exchange valve Y3, and the mode switching of crab type steering and sharp turn steering is performed.

It can be seen from the above two embodiments of the electric-control multimode steering valve that as to crab type steering and sharp turn steering, the inputs of pressure oil into the two groups of independent steering oil cylinders are parallel inputs, the steering pressures thereof do not influence each other. Compared with the conventional tandem front and rear axle oil cylinders, the pressure applied from oil to the steering cylinders is effectively reduced, reducing the possibilities of damage to the sealing elements of oil cylinders effectively. Also as to a full hydraulic steering device, the operating pressure is normally not more than 20 MPa, therefore the reduction of the oil pressure reduces the possibilities of damage of the full hydraulic steering device, thus improves the operating reliability of the system.

Moreover, as to sharp turn steering and crab type steering, the two above embodiments both use a single flow distributing and collecting valve. Compared with the conventional double flow distributing and collecting valves, the same flow distributing and collecting function is achieved and the oil pressure loss by the flow distributing and collecting valve is further reduced, thus the easiness of steering is improved.

An engineering vehicle is capable of reversing, during which the front wheels before become the actual rear wheels, and the rear wheels before become the actual front wheels, thus the switching from the front axle independent steering mode to the rear axle independent steering mode is naturally achieved. But there still exists a problem, i.e. the steering direction manipulated by the driver is opposite to the actual steering direction, which does not conform to the operating habit of the driver. In order to solve the problem, a new electromagnetic exchange valve may be added to switch the oil flow direction, and be arranged outside of the electric-control multimode steering valve of this embodiment to achieve its function, or be integrated into the electric-control multimode steering valve of this embodiment.

Figure 9:
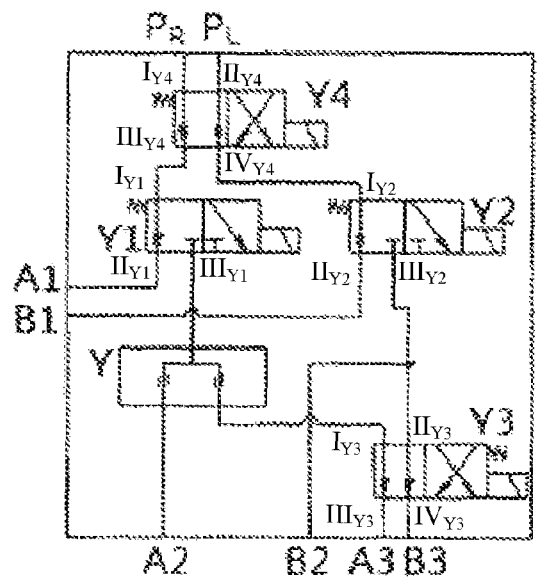
FIG. 9 is a structural schematic view showing the electric-control multimode steering valve according to the third embodiment of the invention.

FIG. 9 is a structural schematic view showing the electric-control multimode steering valve according to the third embodiment of the invention. Compared with the second embodiment, the electric-control multimode steering valve of this embodiment is integrated with a fourth electromagnetic exchange valve Y4, which has two groups of paired oil ports. The first group of valve oil ports [$P_R$, $P_L$] of the valve body is communicated with the first group of oil ports [$I_{Y4}$, $II_{Y4}$] of the fourth electromagnetic exchange valve Y4, and are in turn communicated with the first oil ports [$I_{Y1}$, $I_{Y2}$] of the first electromagnetic exchange valve Y1 and the second electromagnetic exchange valve Y2 via the second group of oil ports [$II_{Y4}$, $IV_{Y4}$] of the fourth electromagnetic exchange valve Y4.

If the electric-control multimode steering valve of this embodiment is mounted in a steering hydraulic control system, a fourth operating mode may be achieved by switching the first electromagnetic exchange valve, the second electromagnetic exchange valve and the fourth electromagnetic exchange valve. During the fourth operating mode, the first group of valve oil ports [$P_R$, $P_L$] of the valve body is communicated with the second group of valve oil ports [A1, B1], and the oil flow directions in the first group of valve oil ports [$P_R$, $P_L$] and the second group of valve oil ports [A1, B1] are different from those during the first operating mode. As shown in FIG. 9, during the first operating mode, the first electromagnetic exchange valve and the second electromagnetic exchange valve are both deenergized, the fourth electromagnetic exchange valve is also deenergized. The valve oil port $P_R$ is communicated with the valve oil port A1, and the valve oil port $P_L$ is communicated with the valve oil port B1. During the fourth operating mode, the first electromagnetic exchange valve and the second electromagnetic exchange valve are both deenergized, but the fourth electromagnetic exchange valve is energized. The valve oil port $P_L$ is communicated with the valve oil port A1, and the valve oil port $P_R$ is communicated with the valve oil port B1. Thus the pressure oil flow direction in the valve body is changed so as to conform to the operating habit of the driver when the engineering vehicle is reversing.

In the above embodiments, a two-position four-way electromagnetic exchange valve may be used as the third electromagnetic exchange valve and the fourth electromagnetic exchange valve according to the required oil ports and function.

Figure 6:
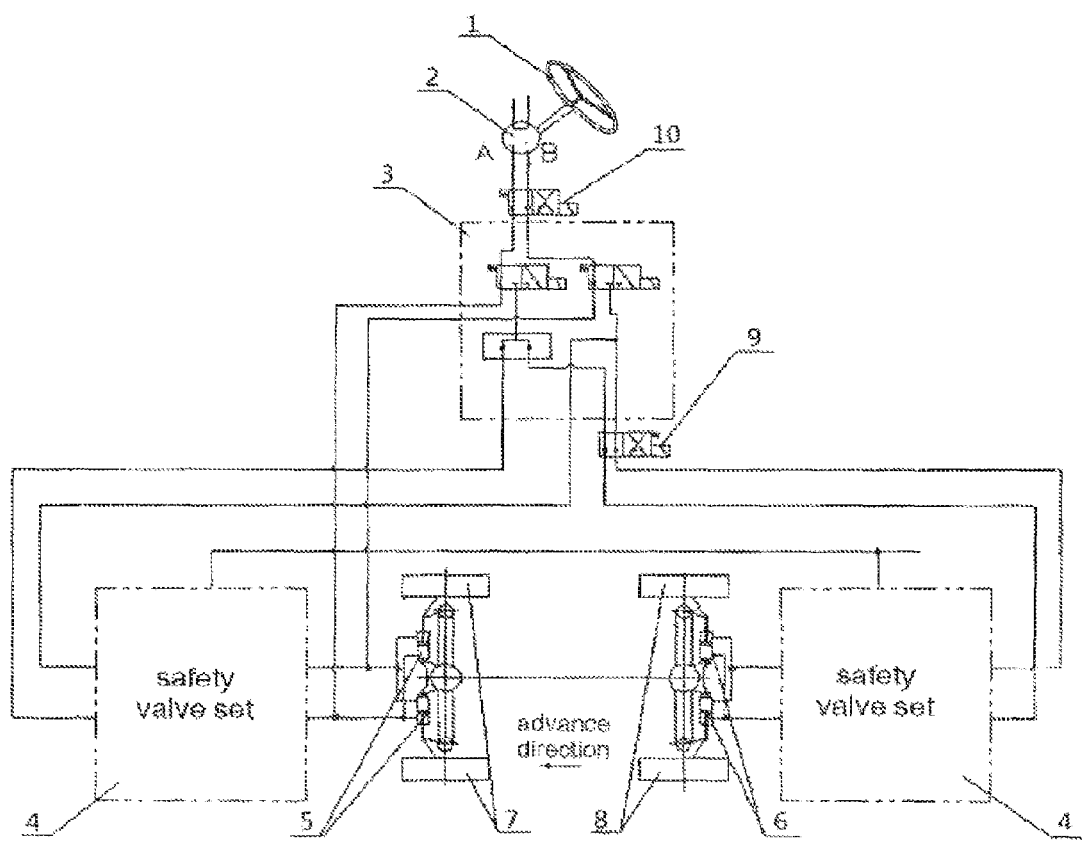
FIG. 6 is a structural schematic view showing a steering hydraulic control system employing the embodiment of FIG. 5.

Each of the electric-control multimode steering valves in the above embodiments can be applied into a steering hydraulic control system. Taking the embodiment of FIG. 5 as an example, FIG. 6 is a structural schematic view showing a steering hydraulic control system employing the embodiment of FIG. 5. As shown in FIG. 6, the steering hydraulic control system includes a full hydraulic steering device 2, a safety valve set 4, a first group of independent steering oil cylinder 5, a second group of independent steering oil cylinder 6 and an electric-control multimode steering valve 3 shown in FIG. 5. The full hydraulic steering device 2 has two groups of oil ports, the first group of which establishes a system circuit with a pressure circuit and an oil circuit respectively.

The first group of valve oil ports of the valve body of the electric-control multimode steering valve 3 is communicated with the second group of oil ports of the full hydraulic steering device 2. The second group of valve oil ports of the valve body is communicated with the first group of independent steering oil cylinder 5. The third and fourth groups of valve oil ports of the valve body are communicated with the first group of independent steering oil cylinder 5 and the second group of independent steering oil cylinder 6 via the safety valve set 4.

In this embodiment of steering hydraulic control system, the safety valve set 4 is used to protect the oil cylinders from being over-pressurized. Taking the function of feeding oil to oil cylinders into consideration, the safety valve set 4 may employ conventional various structures. Since it is not key to the invention, its description is omitted.

A third electromagnetic exchange valve 9 may be added between the electric-control multimode steering valve 3 and the second group of independent steering oil cylinder 6, so as to achieve the mode selection switching of crab type steering and sharp turn steering. A fourth electromagnetic exchange valve 10 may be added between the electric-control multimode steering valve 3 and the full hydraulic steering device 2, so as to conform to the operating habit of the driver when the engineering vehicle is reversing.

Figure 8:
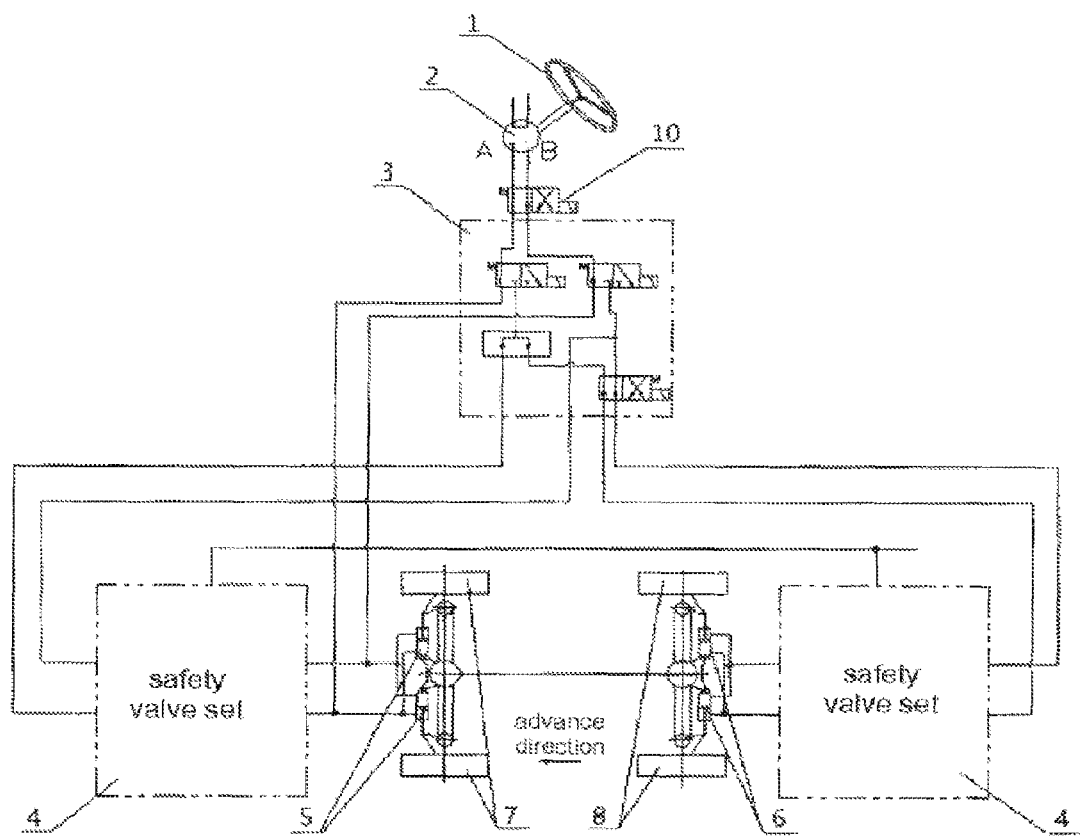
FIG. 8 is a structural schematic view showing a steering hydraulic control system employing the embodiment of FIG. 7.

Taking the electric-control multimode steering valve in the embodiment of FIG. 7 as an example, FIG. 8 is a structural schematic view showing a steering hydraulic control system employing the embodiment of FIG. 7. Compared with the steering hydraulic control system of FIG. 6, the third electromagnetic exchange valve 9 is integrated into the electric-control multimode steering valve 3.

Figure 10:
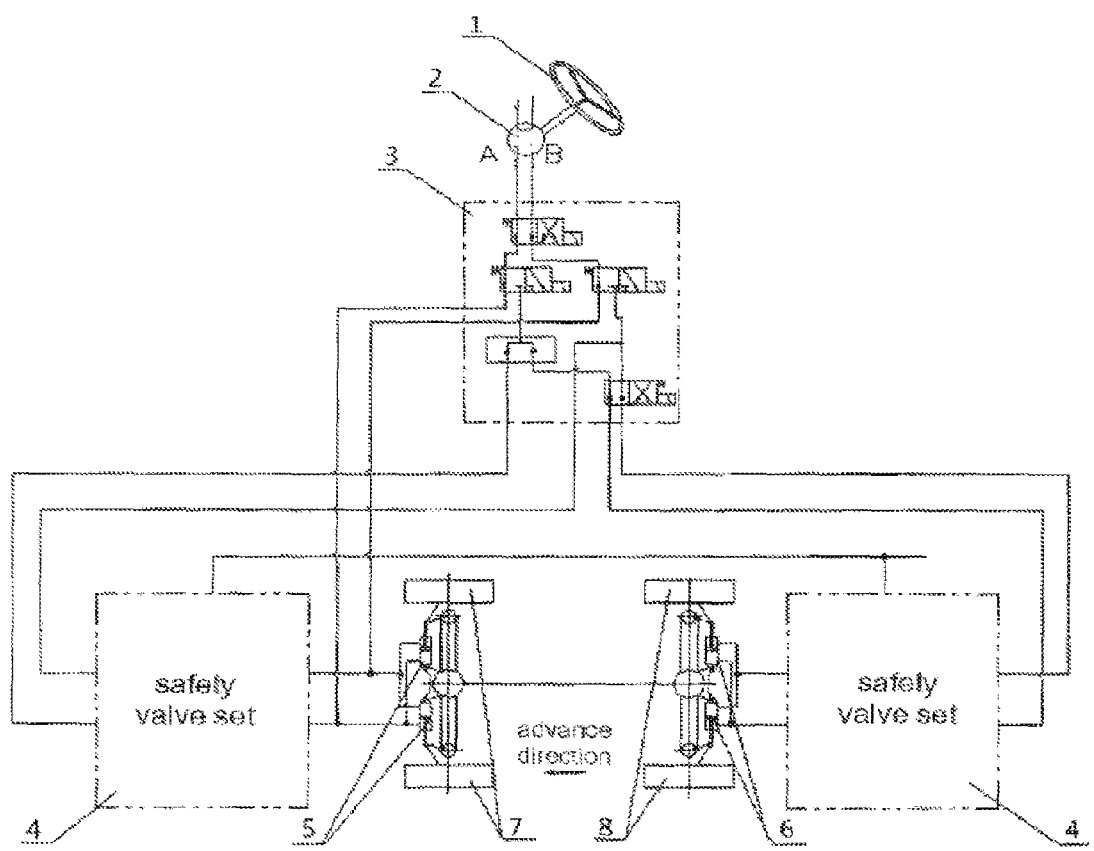
FIG. 10 is a structural schematic view showing a steering hydraulic control system employing the embodiment of FIG. 9.

Taking the electric-control multimode steering valve in the embodiment of FIG. 9 as an example, FIG. 10 is a structural schematic view showing a steering hydraulic control system employing the embodiment of FIG. 9. Compared with the steering hydraulic control system of FIG. 6, the third electromagnetic exchange valve 9 and the fourth electromagnetic exchange valve 10 are both integrated into the electric-control multimode steering valve 3. Such an electric-control multimode steering valve has a high integration level and improves usability for users.

All the valves used in the above various electric-control multimode steering valves may employ common conventional valves, which are mature in technology, reliable and cost effective. During operation, each electromagnetic exchange valve in the electric-control multimode steering valve switches upon energization and resets upon deenergization. Even a circuit failure occurs during operation, the valve core resets automatically under spring action, recovering the function of front wheel independent steering, so as to ensure the road safety.

The above embodiments of steering hydraulic control system are suitable for use in various engineering vehicles, particularly in wheel type crane. Such a wheel type crane may include a vehicle body, a driver's cab (both not shown) and a steering hydraulic control system. The vehicle body has two groups of wheels 7, 8, and the driver's cab has a steering wheel 1 and an electric-control multimode selection switch (not shown in figures). The steering wheel 1 is connected to a full hydraulic steering device 2 in the steering hydraulic control system, the two groups of wheels 7, 8 are connected to a first group of independent steering oil cylinder 5 and a second group of independent steering oil cylinder 6 in the steering hydraulic control system respectively. The electric-control multimode selection switch is connected to electromagnetic exchange valves in an electric-control multimode steering valve of the steering hydraulic control system. The electric-control multimode selection switch sends out corresponding switching signals to the electromagnetic exchange valves in the electric-control multimode steering valve by selecting various operating modes.

The operating principle of the invention will be described hereafter, taking the embodiments of the electric-control multimode steering valve and the steering hydraulic control system in FIGS. 9 and 10 as examples.

In FIG. 10, the first group of oil ports of the full hydraulic steering device 2 establishes a system circuit with the pressure circuit and oil circuit. The pressure oil flow direction may be switched by manipulating the steering wheel 1 as actually required. The default operating mode is the front axle independent steering mode, in which all electromagnetic exchange valves in the electric-control multimode steering valve are deenergized, at this time all the pressure oil flows from the full hydraulic steering device 2 into the first group of independent steering oil cylinder 5 via the electric-control multimode steering valve 3, so as to achieve the front axle independent steering mode in the advance direction shown in the figure.

During sharp turn steering mode, the electromagnetic exchange valves Y1 and Y2 in the electric-control multimode steering valve 3 are both energized, the electromagnetic exchange valves Y1 and Y4 are deenergized, at this time the pressure oil outputted from the full hydraulic steering device 2 flows into the first group of independent steering oil cylinder 5 and the second group of independent steering oil cylinder 6 via the electric-control multimode steering valve 3, so as to achieve sharp turn steering function.

During crab type steering mode, the electromagnetic exchange valves Y1, Y2 and Y3 in the electric-control multimode steering valve 3 are energized, the electromagnetic exchange valves Y4 are deenergized, at this time the pressure oil outputted from the full hydraulic steering device 2 flows into the first group of independent steering oil cylinder 5 and the second group of independent steering oil cylinder 6 via the electric-control multimode steering valve 3, but the pressure oil flow direction into the second group of independent steering oil cylinder 6 is opposite to that in sharp turn steering mode, so as to achieve crab type steering function.

When the vehicle is reversing, the front wheels before become the rear wheels, and the rear wheels before become the front wheels. If the oil output direction from the steering device is not changed, the vehicle will turn left (right) with the steering wheel turning right (left), which is not conform to the operating habit of the driver. Therefore when the vehicle is reversing, the electromagnetic exchange valve Y4 is energized to change the oil output direction from the full hydraulic steering device, so that the steering operation when reversing still conforms to the operating habit of the driver.

It should be clarified that the above embodiments are only used to illustrate the technical solutions of the invention without limiting. While the invention has been described with reference to its prefer embodiments, it is appreciated for a person skilled in the art that modifications may be made to the specific embodiments of the invention, or equivalent replacement may be made to some technical features without departing from the spirit of the invention, and such modifications and replacement shall fall within the protection scope of the following claims.

What is claimed is:

1. An electric-control multimode steering valve, comprising a flow distributing and collecting valve, a first electromagnetic exchange valve and a second electromagnetic exchange valve, wherein a valve body of the electric-control multimode steering valve comprises four groups of paired valve oil ports, the flow distributing and collecting valve has a flow collecting port, a first flow distributing port and a second flow distributing port, the first electromagnetic exchange valve and the second electromagnetic exchange valve each has a first oil port, a second oil port and a third oil port, the first oil ports of the first electromagnetic exchange valve and the second electromagnetic exchange valve are respectively communicated with the first group of valve oil ports of the valve body, the second oil ports of the first electromagnetic exchange valve and the second electromagnetic exchange valve are respectively communicated with the second group of valve oil ports of the valve body, the third oil port of the first electromagnetic exchange valve is communicated with the flow collecting port of the flow distributing and collecting valve, the first flow distributing port of the flow distributing and collecting valve and the third oil port of the second electromagnetic exchange valve are respectively communicated with the third group of valve oil ports of the valve body, the second flow distributing port of the flow distributing and collecting valve and the third oil port of the second electromagnetic exchange valve are respectively communicated with the fourth group of valve oil ports of the valve body.

2. The electric-control multimode steering valve according to claim 1, wherein the electric-control multimode steering valve switches the first electromagnetic exchange valve and the second electromagnetic exchange valve to achieve: a first operating mode, during which the first group of valve oil ports of the valve body is communicated with the second group of valve oil ports; and a second operating mode, during which the first group of valve oil ports of the valve body is communicated with the third group of valve oil ports and the fourth group of valve oil ports.

3. The electric-control multimode steering valve according to claim 2, further comprising a third electromagnetic exchange valve which has two groups of paired oil ports, the second flow distributing port of the flow distributing and collecting valve and the third oil port of the second electromagnetic exchange valve are respectively communicated with the first group of oil ports of the third electromagnetic exchange valve, in turn communicated with the fourth group of valve oil ports of the valve body via the second group of oil ports of the third electromagnetic exchange valve.

4. The electric-control multimode steering valve according to claim 3, wherein the electric-control multimode steering valve switches the first electromagnetic exchange valve, the second electromagnetic exchange valve and the third electromagnetic exchange valve to achieve a third operating mode, during which the first group of valve oil ports of the valve body is communicated with the third group of valve oil ports and the fourth group of valve oil ports, the oil flow directions in the first group of valve oil ports and the fourth group of valve oil ports are different from those in the second operating mode.

5. The electric-control multimode steering valve according to claim 4, further comprising a fourth electromagnetic exchange valve which has two groups of paired oil ports, the first group of valve oil ports of the valve body is communicated with the first group of oil ports of the fourth electromagnetic exchange valve, in turn communicated with the first oil ports of the first electromagnetic exchange valve and the second electromagnetic exchange valve via the second group of oil ports of the fourth electromagnetic exchange valve.

6. The electric-control multimode steering valve according to claim 5, wherein the third electromagnetic exchange valve and the fourth electromagnetic exchange valve are both two-position four-way electromagnetic exchange valve.

7. The electric-control multimode steering valve according to claim 5, wherein the electric-control multimode steering valve switches the first electromagnetic exchange valve, the second electromagnetic exchange valve and the fourth electromagnetic exchange valve to achieve a fourth operating mode, during which the first group of valve oil ports of the valve body is communicated with the second group of valve oil ports, the oil flow directions in the first group of valve oil ports and the second group of valve oil ports are different from those in the first operating mode.

8. The electric-control multimode steering valve according to claim 7, wherein the third electromagnetic exchange valve and the fourth electromagnetic exchange valve are both two-position four-way electromagnetic exchange valve.

9. The electric-control multimode steering valve according to claim 1, wherein the first electromagnetic exchange valve and the second electromagnetic exchange valve are both two-position three-way electromagnetic exchange valve.

10. A steering hydraulic control system comprising a full hydraulic steering device, a safety valve set, a first group of independent steering oil cylinder and a second group of independent steering oil cylinder, wherein the full hydraulic steering device has two groups of oil ports, the first group of which establishes a system circuit with a pressure circuit and an oil circuit respectively, wherein the steering hydraulic control system further comprises an electric-control multimode steering valve comprising:
a flow distributing and collecting valve, a first electromagnetic exchange valve and a second electromagnetic exchange valve, wherein a valve body of the electric-control multimode steering valve comprises four groups of paired valve oil ports, the flow distributing and collecting valve has a flow collecting port, a first flow distributing port and a second flow distributing port, the first electromagnetic exchange valve and the second electromagnetic exchange valve each has a first oil port, a second oil port and a third oil port, the first oil ports of the first electromagnetic exchange valve and the second electromagnetic exchange valve are respectively communicated with the first group of valve oil ports of the valve body, the second oil ports of the first electromagnetic exchange valve and the second electromagnetic exchange valve are respectively communicated with the second group of valve oil ports of the valve body, the third oil port of the first electromagnetic exchange valve is communicated with the flow collecting port of the flow distributing and collecting valve, the first flow distributing port of the flow distributing and collecting valve and the third oil port of the second electromagnetic exchange valve are respectively communicated with the third group of valve oil ports of the valve body, the second flow distributing port of the flow distributing and collecting valve and the third oil port of the second electromagnetic exchange valve are respectively communicated with the fourth group of valve oil ports of the valve body,
the first group of valve oil ports of the valve body of the electric-control multimode steering valve is communicated with the second group of oil ports of the full hydraulic steering device, the second group of valve oil ports of the valve body is communicated with the first group of independent steering oil cylinder, the third and fourth groups of valve oil ports of the valve body of the electric-control multimode steering valve are communicated with the first group of independent steering oil cylinder and the second group of independent steering oil cylinder via the safety valve set.

11. The steering hydraulic control system according to claim 10, wherein the electric-control multimode steering valve switches the first electromagnetic exchange valve and the second electromagnetic exchange valve to achieve: a first operating mode, during which the first group of valve oil ports of the valve body is communicated with the second group of valve oil ports; and a second operating mode, during which the first group of valve oil ports of the valve body is communicated with the third group of valve oil ports and the fourth group of valve oil ports.

12. The steering hydraulic control system according to claim 11, wherein the electric-control multimode steering valve further comprises a third electromagnetic exchange valve which has two groups of paired oil ports, the second flow distributing port of the flow distributing and collecting valve and the third oil port of the second electromagnetic exchange valve are respectively communicated with the first group of oil ports of the third electromagnetic exchange valve, in turn communicated with the fourth group of valve oil ports of the valve body via the second group of oil ports of the third electromagnetic exchange valve.

13. The steering hydraulic control system according to claim 12, wherein the electric-control multimode steering valve switches the first electromagnetic exchange valve, the second electromagnetic exchange valve and the third electromagnetic exchange valve to achieve a third operating mode, during which the first group of valve oil ports of the valve body is communicated with the third group of valve oil ports and the fourth group of valve oil ports, the oil flow directions in the first group of valve oil ports and the fourth group of valve oil ports are different from those in the second operating mode.

14. The steering hydraulic control system valve according to claim 13, wherein the electric-control multimode steering valve further comprises a fourth electromagnetic exchange valve which has two groups of paired oil ports, the first group of valve oil ports of the valve body is communicated with the first group of oil ports of the fourth electromagnetic exchange valve, in turn communicated with the first oil ports of the first electromagnetic exchange valve and the second electromagnetic exchange valve via the second group of oil ports of the fourth electromagnetic exchange valve.

15. The steering hydraulic control system according to claim 14, wherein the third electromagnetic exchange valve and the fourth electromagnetic exchange valve are both two-position four-way electromagnetic exchange valve.

16. The steering hydraulic control system according to claim 14, wherein the electric-control multimode steering valve switches the first electromagnetic exchange valve, the second electromagnetic exchange valve and the fourth electromagnetic exchange valve to achieve a fourth operating mode, during which the first group of valve oil ports of the valve body is communicated with the second group of valve oil ports, the oil flow directions in the first group of valve oil ports and the second group of valve oil ports are different from those in the first operating mode.

17. The steering hydraulic control system according to claim 16, wherein the third electromagnetic exchange valve and the fourth electromagnetic exchange valve are both two-position four-way electromagnetic exchange valve.

18. The steering hydraulic control system according to claim 10, wherein the first electromagnetic exchange valve and the second electromagnetic exchange valve are both two-position three-way electromagnetic exchange valve.

19. A wheel crane, comprising a vehicle body having two groups of wheels and a driver's cab having a steering wheel and an electric-control multimode selection switch therein, wherein the wheel crane comprises the steering hydraulic control system according to claim 10, the steering wheel is connected to the full hydraulic steering device in the steering hydraulic control system, the two groups of wheels are connected to a first group of independent steering oil cylinder and a second group of independent steering oil cylinder in the steering hydraulic control system respectively, the electric-control multimode selection switch is connected to electromagnetic exchange valves in the electric-control multimode steering valve of the steering hydraulic control system, the electric-control multimode selection switch sends out corresponding switching signals to the electromagnetic exchange valves in the electric-control multimode steering valve by selecting various operating modes.

\* \* \* \* \*